United States Patent
Kojoh et al.

[11] Patent Number: 5,936,049
[45] Date of Patent: Aug. 10, 1999

[54] PROCESS FOR PREPARING SOLID TITANIUM CATALYST COMPONENT, OLEFIN POLYMERIZATION CATALYST AND PROCESS FOR OLEFIN POLYMERIZATION

[75] Inventors: Shinichi Kojoh; Masao Nakano, both of Yamaguchi, Japan

[73] Assignee: Mitsui Chemicals, Inc., Tokyo, Japan

[21] Appl. No.: 08/833,532

[22] Filed: Apr. 7, 1997

[30] Foreign Application Priority Data

Apr. 9, 1996 [JP] Japan ................... 8-086697
Apr. 11, 1996 [JP] Japan ................... 8-089203

[51] Int. Cl.$^6$ ............... C08F 4/44; C08F 4/70; B01J 31/00; B01J 37/00

[52] U.S. Cl. ............ 526/114; 526/115; 526/122; 526/124.9; 526/125.3; 502/104; 502/108; 502/110; 502/111; 502/118; 502/129; 502/132; 502/133; 502/134

[58] Field of Search ................ 502/104, 110, 502/129, 132, 134, 133, 108, 111, 118; 526/114, 115, 122, 124.9, 125.3

[56] References Cited

U.S. PATENT DOCUMENTS

| | | | |
|---|---|---|---|
| 4,362,648 | 12/1982 | Dietz et al. | 526/125 |
| 4,487,845 | 12/1984 | Triplett | 502/134 |
| 4,544,717 | 10/1985 | Mayr et al. | 502/134 |
| 4,585,749 | 4/1986 | Pierce et al. | 502/134 |
| 5,633,419 | 5/1997 | Spencer et al. | 502/134 |

FOREIGN PATENT DOCUMENTS

| | | |
|---|---|---|
| 0115691A1 | 8/1984 | European Pat. Off. . |
| 0481749A2 | 4/1992 | European Pat. Off. . |
| 0563815A1 | 10/1993 | European Pat. Off. . |

OTHER PUBLICATIONS

Vita Di Noto et al., Makromol. Chem. 193, 1653–1663 (1992). No month.

Encyclopaedia Chimica 1, (Kyoritsu Shuppan K.K., first edition, Feb. 28, 1962), Cadmium Chloride Structure, (Ryoichi Kiriyama).

Primary Examiner—Mark L. Bell
Assistant Examiner—J. Pasterczyk
Attorney, Agent, or Firm—Birch, Stewart, Kolasch & Birch, LLP

[57] ABSTRACT

Disclosed is a process for preparing a solid titanium catalyst component, comprising contacting (a) a liquid magnesium compound, (b) a liquid titanium compound, (c) an electron donor and (d) a solid divalent metallic halide. In this process, the solid divalent metallic halide is one having a crystalline structure of the cadmium chloride type. The contact of the component (a) with the component (b) is preferably carried out in the presence of the solid divalent metallic halide (d). According to this process, there can be obtained a solid titanium catalyst component capable of polymerizing olefins with an extremely high activity and capable of producing polyolefins of high stereoregularity when α-olefins of 3 or more carbon atoms are polymerized.

20 Claims, 1 Drawing Sheet

PROCESS FOR PREPARING SOLID TITANIUM CATALYST COMPONENT, OLEFIN POLYMERIZATION CATALYST AND PROCESS FOR OLEFIN POLYMERIZATION

FIELD OF THE INVENTION

The present invention relates to a solid titanium catalyst component capable of polymerizing α-olefins such as ethylene and propylene with a high activity and capable of producing polyolefins of high stereoregularity when α-olefins of 3 or more carbon atoms are polymerized. The invention also relates to a prepolymerized catalyst and an olefin polymerization catalyst each of which contains the solid titanium catalyst component, and to a process for olefin polymerization.

BACKGROUND OF THE INVENTION

Catalysts comprising a titanium catalyst component and an organoaluminum compound have been commonly known hitherto as those for preparing polyolefins. Particularly, catalysts using a carrier-supported solid titanium catalyst component as the titanium catalyst component are known to exhibit a high polymerization activity.

Above all, the catalysts using a titanium catalyst component supported on magnesium chloride as the solid titanium catalyst component are known to exhibit a high polymerization activity and to produce polyolefins of high Istereoregularity when α-olefins of 3 or more carbon atoms are polymerized.

In this connection, various catalysts capable of producing polyolefins of higher stereoregularity (sometimes referred to as "highly stereospecific catalysts" hereinafter) have been proposed. For example, there has been proposed a catalyst formed from a solid titanium catalyst component supported on magnesium chloride which contains titanium, magnesium, halogen and an electron donor, an organoaluminum compound and an electron donating compound (electron donor) as a third component. Specifically, there has been proposed a highly stereospecific catalyst formed from a solid titanium catalyst component in which a titanium compound and a carboxylic acid ester as an electron donor are supported on magnesium chloride, an organoaluminum compound and a silicon compound having Si—OR (R is a hydrocarbon group) as the electron donor of the third component.

Meanwhile, Japanese Patent Laid-Open Publication No. 83006/1983 discloses that, in the preparation of the solid titanium catalyst component by contacting a magnesium compound, a titanium compound and an electron donor, if the magnesium compound and the titanium compound are contacted in a liquid state, the resulting solid titanium catalyst component shows high activity and high stereospecificity.

The present inventors have further studied such solid titanium catalysts showing high activity and high stereospecificity as mentioned above. As a result, they have found that a solid titanium catalyst component having an extremely high polymerization activity and showing high stereospecificity can be obtained by contacting a liquid magnesium compound, a liquid titanium compound, an electron donor and a solid divalent metallic halide. Based on the finding, the present invention has been accomplished.

OBJECT OF THE INVENTION

It is an object of the present invention to provide a process for preparing a solid titanium catalyst component capable of polymerizing α-olefins such as ethylene and propylene with an extremely high activity and capable of producing polyolefins of high stereoregularity when α-olefins of 3 or more carbon atoms are polymerized. It is another object of the invention to provide a prepolymerized catalyst and an olefin polymerization catalyst each of which contains the solid titanium catalyst component. It is a further object of the invention to provide a process for olefin polymerization.

SUMMARY OF THE INVENTION

The process for preparing a solid titanium catalyst component according to the invention comprises contacting:

(a) a liquid magnesium compound,
(b) a liquid titanium compound,
(c) an electron donor, and
(d) a solid divalent metallic halide.

In this invention, a solid divalent metallic halide having a crystalline structure of cadmium chloride type is preferably used as the solid divalent metallic halide (d).

In the contact of the components (a) to (d), the contact of the liquid magnesium compound (a) with the liquid titanium compound (b) is preferably carried out in the presence of the solid divalent metallic halide (d).

The olefin polymerization catalyst according to the invention comprises (I) a solid titanium catalyst component obtained by the above process, (II) an organometallic compound, and optionally, (III) an electron donor.

The prepolymerized catalyst according to the invention is obtained by prepolymerizing an olefin in the presence of the above-mentioned olefin polymerization catalyst.

In the process for olefin polymerization according to the invention, an olefin is polymerized in the presence of the above-mentioned olefin polymerization catalyst.

In the process of the invention, an olefin may be polymerized in the presence of a catalyst composed of the above-mentioned prepolymerized catalyst, and optionally, (II) the organometallic compound and/or (III) the electron donor.

DETAILED DESCRIPTION OF THE INVENTION

Figure 1:
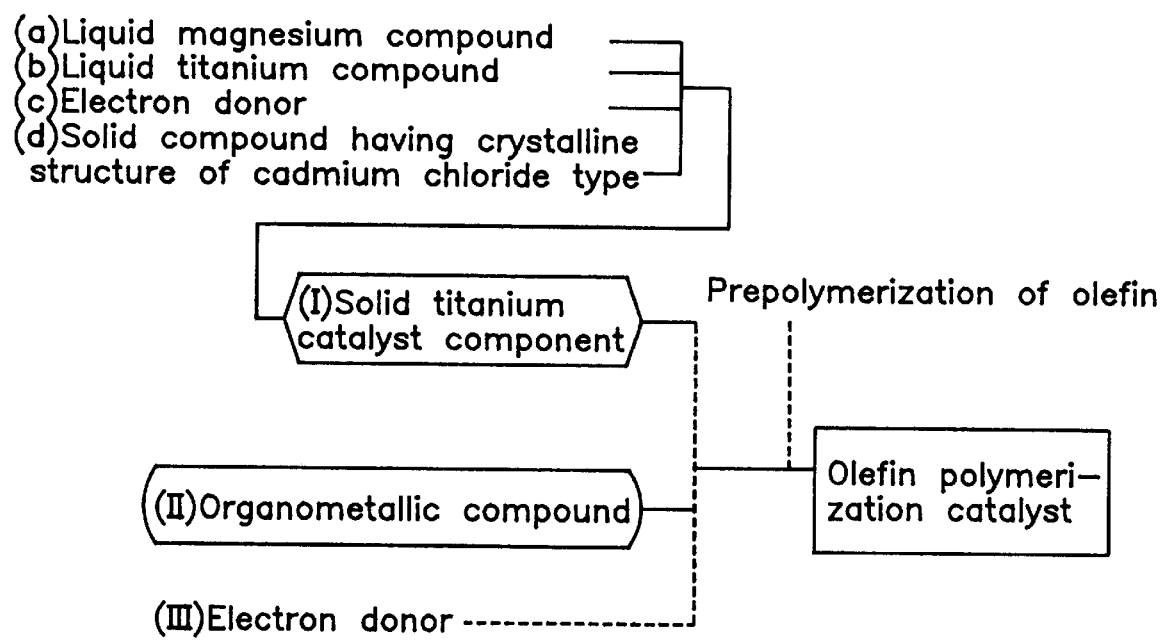
FIG. 1 shows an example of the process for preparing a solid titanium catalyst component according to the present invention and shows an example of the process for preparing an olefin polymerization catalyst.

The process for preparing a solid titanium catalyst component, the olefin polymerization catalyst, the prepolymerized catalyst and the process for olefin polymerization according to the invention are described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

In the present invention, a solid titanium catalyst component is prepared by contacting (a) a liquid magnesium compound, (b) a liquid titanium compound, (c) an electron donor and (d) a solid divalent metallic halide.

First, the components used for preparing the solid titanium catalyst component are described.

(a) Liquid Magnesium Compound

In the process for preparing a solid titanium catalyst component according to the invention, a liquid magnesium compound (a) is used. As the liquid magnesium compound (a), a magnesium compound which is liquid as it is may be used. Or, when the magnesium compound is a solid, it can be used in the form of a solution of the magnesium compound.

The magnesium compound includes (a-1) a magnesium compound having reduction ability and (a-2) a magnesium compound having no reduction ability.

The magnesium compound (a-1) having reduction ability is, for example, a magnesium compound represented by the following formula:

$$MgX^1{}_n R^1{}_{2-n}$$

wherein n is a number of $0 \leq n < 2$, $R^1$ is hydrogen, an alkyl group of 1 to 20 carbon atoms, an aryl group or a cycloalkyl group, when n is 0, two of $R^1$ may be the same as or different from each other, and $X^1$ is halogen, hydrogen or an alkoxy group.

Examples of the magnesium compounds (a-1) having reduction ability include:

dialkylmagnesium compounds, such as dimethylmagnesium, diethylmagnesium, dipropylmagnesium, dibutylmagnesium, diamylmagnesium, dihexylmagnesium, didecylmagnesium, octylbutylmagnesium and ethylbutylmagnesium;

alkylmagnesium halides, such as ethylmagnesium chloride, propylmagnesium chloride, butylmagnesium chloride, hexylmagnesium chloride and amylmagnesium chloride;

alkylmagnesium alkoxides, such as butylethoxymagnesium, ethylbutoxymagnesium and octylbutoxymagnesium; and butylmagnesium hydride.

The magnesium compound (a-2) having no reduction ability is, for example, a magnesium compound represented by the following formula:

$$Mg(OR^2)_n X^2{}_{2-n}$$

wherein n is a number of $0 \leq n \leq 2$, $R^2$ is a hydrocarbon group of 1 to 20 carbon atoms, when n is 2, two of $R^2$ may be the same as or different from each other, and $X^2$ is halogen or hydrogen.

Examples of the magnesium compounds (a-2) having no reduction ability include:

magnesium halides, such as magnesium chloride, magnesium bromide, magnesium iodide and magnesium fluoride;

alkoxymagnesium halides, such as methoxymagnesium chloride, ethoxymagnesium chloride, isopropoxymagnesium chloride, butoxymagnesium chloride and octoxymagnesium chloride;

aryloxymagnesium halides, such as phenoxymagnesium chloride and methylphenoxymagnesium chloride;

alkoxymagnesiums, such as ethoxymagnesium, isopropoxymagnesium, butoxymagnesium, n-octoxymagnesium and 2-ethylhexoxymagnesium;

aryloxymagnesiums, such as phenoxymagnesium and dimethylphenoxymagnesium; and magnesium hydrides.

Also employable as the magnesium compounds (a-2) having no reduction ability are carboxylic acid esters of magnesium, such as magnesium laurate and magnesium stearate, and metallic magnesium.

The magnesium compounds (a-2) having no reduction ability may be compounds derived from the aforementioned magnesium compounds (a-1) having reduction ability or compounds derived during the preparation of the catalyst component. For deriving the magnesium compounds (a-2) having no reduction ability from the magnesium compounds (a-1) having reduction ability, for example, the magnesium compounds (a-1) having reduction ability are brought into contact with polysiloxane compounds, halogen-containing silane compounds, halogen-containing aluminum compounds, esters, alcohols, halogen-containing compounds, or compounds having OH group or active carbon-oxygen bond.

The magnesium compounds may be used in combination or two or more kinds.

The magnesium compounds (a-1) having reduction ability or the magnesium compounds (a-2) having no reduction ability may be used together with metallic compounds described later as the catalyst component (II), to form complex compounds or double compounds. The metallic compounds are, for example, compounds of aluminum, zinc, boron, beryllium, sodium and potassium. Mixtures of the magnesium compounds and the metallic compounds are also employable.

For preparing the solid titanium catalyst component, other magnesium compounds than the above-mentioned can be also employed, but it is preferable that the magnesium compound takes a form of a halogen-containing magnesium compound in the finally obtained solid titanium catalyst component. Therefore, when a magnesium compound containing no halogen is used, the magnesium compound is preferably contacted with a halogen-containing compound during the preparation of the catalyst component.

Of the above compounds, preferable are the magnesium compounds (a-2) having no reduction ability, more preferable are halogen-containing magnesium compounds, and particularly preferable are magnesium chloride, alkoxymagnesium chloride and aryloxymagnesium chloride.

When a solid magnesium compound is selected from the above compounds, it can be made liquid state by dissolving it in an electron donor (c-i).

Examples of the electron donors (c-i) employable herein include alcohols, phenols, ketones, aldehydes, ethers, amines and pyridines, details of which being described later as the electron donor (c).

Also employable are metallic acid esters, such as tetraethoxytitanium, tetra-n-propoxytitanium, tetra-i-propoxytitanium, tetrabutoxytitanium, tetrahexoxytitanium, tetrabutoxyzirconium and tetraethoxyzirconium.

Of these, alcohols and metallic acid esters are particularly preferably used.

In order to dissolve the solid magnesium compound in the electron donor (c-i), the solid magnesium compound is contacted with the electron donor (c-i), then they are heated if necessary. This contact is carried out at a temperature of usually 0 to 200° C., preferably 20 to 180° C., more preferably 50 to 150° C.

The above reaction (contact) is preferably carried out in the presence of a hydrocarbon solvent. Examples of the hydrocarbon solvents include aliphatic hydrocarbons, such as pentane, hexane, heptane, octane, decane, dodecane, tetradecane and kerosene; alicyclic hydrocarbons, such as cyclopentane, methylcyclopentane, cyclohexane, methylcyclohexane, cyclooctane and cyclohexane; halogenated hydrocarbons, such as dichloroethane, dichloropropane, trichloroethylene and chlorobenzene; and aromatic hydrocarbons, such as benzene, toluene and xylene.

(b) Liquid Titanium Compound

The liquid titanium compound (b) used in the invention is preferably a tetravalent titanium compound. The tetravalent titanium compound is, for example, a compound represented by the following formula:

$$Ti(OR)_gX_{4-g}$$

wherein R is a hydrocarbon group, X is a halogen atom, and $0 \leq g \leq 4$.

Examples of such titanium compounds include:

titanium tetrahalides, such as $TiCl_4$, $TiBr_4$ and $TiCl_2Br_2$;

alkoxytitanium trihalides, such as $Ti(OCH_3)Cl_3$, $Ti(OC_2H_5)Cl_3$, $Ti(On-C_4H_9)Cl_3$, $Ti(OC_2H_5)Br_3$ and $Ti(O\text{-}iso\text{-}C_4H_9)Br_3$;

dialkoxytitanium dihalides, such as $Ti(OCH_3)_2Cl_2$, $Ti(OC_2H_5)_2Cl_2$, $Ti(On\text{-}C_4H_9)_2Cl_2$ and $Ti(OC_2H_5)_2Br_2$;

trialkoxytitanium monohalides, such as $Ti(OCH_3)_3Cl$, $Ti(OC_2H_5)_3Cl$, $Ti(On\text{-}C_4H_9)_3Cl$ and $Ti(OC_2H_5)_3Br$; and tetraalkoxytitaniums, such as $Ti(OCH_3)_4$, $Ti(OC_2H_5)_4$, $Ti(On\text{-}C_4H_9)_4$, $Ti(O\text{-}iso\text{-}C_4H_9)_4$ and $Ti(O\text{-}2\text{-ethylhexyl})_4$.

Of these, preferable are titanium tetrahalides, and particularly preferable is titanium tetrachloride. These titanium compounds may be used in combination of two or more kinds. These titanium compounds may be used after diluted with hydrocarbons, halogenated hydrocarbons or aromatic hydrocarbons.

(c) Electron Donor

Examples of the electron donor (c) used for preparing the solid titanium catalyst component include alcohols, phenols, ketones, aldehydes, carboxylic acids, organic acid halides, organic or inorganic acid esters, ethers, acid amides, acid anhydrides, ammonia, amines, nitriles, hydroxy ethers, isocyanates, nitrogen-containing cyclic compounds and oxygen-containing cyclic compounds. More specifically, there can be mentioned:

alcohols having 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol and isopropylbenzyl alcohol;

halogen-containing alcohols having 1 to 18 carbon atoms, such as trichloromethanol, trichloroethanol and trichlorohexanol;

phenols having 6 to 20 carbon atoms, which may have a lower alkyl group, such as phenol, cresol, xylenol, ethylphenol, propylphenol, nonylphenol, cumylphenol and naphthol;

ketones having 3 to 15 carbon atoms, such as acetone, methyl ethyl ketone, methyl isobutyl ketone, acetophenone, benzophenone and benzoquinone;

aldehydes having 2 to 15 carbon atoms, such as acetaldehyde, propionaldehyde, octylaldehyde, benzaldehyde, tolualdehyde and naphthaldehyde;

organic acid esters having 2 to 30 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, coumarin, phthalide, ethyl carbonate and dimethyl carbonate;

acid halides having 2 to 15 carbon atoms, such as acetyl chloride, benzoyl chloride, toluyl chloride and anisoyl chloride;

ethers having 2 to 20 carbon atoms, such as methyl ether, ethyl ether, isopropyl ether, butyl ether, amyl ether, tetrahydrofuran, anisole and diphenyl ether;

acid amides, such as N,N-dimethylacetamide, N,N-diethylbenzamide and N,N-dimethyltoluamide;

amines, such as methylamine, ethylamine, dimethylamine, diethylamine, trimethylamine, triethylamine, tributylamine, tribenzylamine, tetramethylenediamine and hexamethylenediamine;

nitriles, such as acetonitrile, benzonitrile and trinitrile;

hydroxy ethers, such as 1-butoxyethanol, 2-butoxyethanol and 2-butoxypropanol;

acid anhydrides, such as acetic anhydride, phthalic anhydride and benzoic anhydride;

pyrroles, such as pyrrole, methylpyrrole and dimethylpyrrole;

pyrrolines;

pyrrolidines;

indoles;

pyridines, such as pyridine, methylpyridine, ethylpyridine, propylpyridine, dimethylpyridine, ethylmethylpyridine, trimethylpyridine, phenylpyridine, benzylpyridine and pyridine chloride;

nitrogen-containing cyclic compounds, such as piperidines, quinolines and isoquinolines; and oxygen-containing cyclic compounds, such as tetrahydrofuran, 1,4-cineol, 1,8-cineol, pinolfuran, methylfuran, dimethylfuran, diphenylfuran, benzofuran, coumaran, phthalan, tetrahydropyran, pyran and dihydropyran.

Preferred examples of the organic acid esters include polycarboxylic acid esters having skeletons represented by the following formulas.

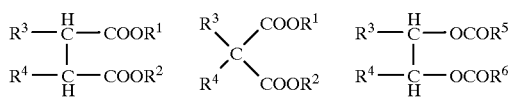

In the above formulas, $R^1$ is a substituted or unsubstituted hydrocarbon group, $R^2$, $R^5$ and $R^6$ are each hydrogen or a substituted or unsubstituted hydrocarbon group, $R^3$ and $R^4$ are each hydrogen or a substituted or unsubstituted hydrocarbon group, and at least one of $R^3$ and $R^4$ is preferably a substituted or unsubstituted hydrocarbon group. $R^3$ and $R^4$ may be linked to each other to form a cyclic structure. When the hydrocarbon groups $R^1$ to $R^6$ are substituted, the substituents contain hetero atoms such as N, O and S and have groups such as C—O—C, COOR, COOH, OH, $SO_3H$, —C—N—C— and $NH_2$.

Particular examples of the polycarboxylic acid esters include:

aliphatic polycarboxylic acid esters, such as diethyl succinate, dibutyl succinate, diethyl methylsuccinate, diisobutyl α-methylglutarate, diethyl methylmalonate, diethyl ethylmalonate, diethyl isopropylmalonate, diethyl butylmalonate, diethyl phenylmalonate, diethyl diethylmalonate, diethyl dibutylmalonate, monooctyl maleate, dioctyl maleate, dibutyl maleate, dibutyl butylmaleate, diethyl butylmaleate, diisopropyl β-methylglutarate, diallyl ethylsuccinate, di-2-ethylhexyl fumarate, diethyl itaconate and dioctyl citraconate;

alicyclic polycarboxylic acid esters, such as diethyl 1,2-cyclohexanecarboxylate, diisobutyl 1,2-cyclohexanecarboxylate, diethyl tetrahydrophthalate and diethyl nadiate;

aromatic polycarboxylic acid esters, such as monoethyl phthalate, dimethyl phthalate, methylethyl phthalate, monoisobutyl phthalate, diethyl phthalate, ethylisobutyl phthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthalenedicarboxylate, triethyl trimellitate and dibutyl trimellitate; and heterocyclic polycarboxylic acid esters, such as 3,4-furandicarboxilic acid.

Other examples of the polycarboxylic acid esters are esters of long-chain dicarboxylic acids, such as diethyl adipate, diisobutyl adipate, diisopropyl sebacate, di-n-butyl sebacate, di-n-octyl sebacate and di-2-ethylhexyl sebacate.

In the present invention, polyether compounds having two or more ether linkages present through plural atoms are also employable as the electron donor (c).

The polyether compound are, for example, compounds in which the atoms present between the ether linkages are each carbon, silicon, oxygen, nitrogen, phosphorus, boron or Ii f sulfur, or they are two or more elements selected those atoms. Of such compounds, preferable are compounds in which relatively bulky substituents are bonded to the atoms present between the ether linkages and the atoms present between the two or more ether linkages include plural carbon atoms. For example, compounds represented by the following formula are preferable.

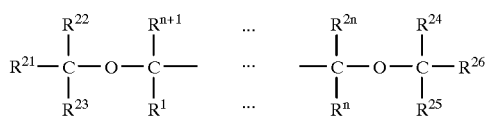

wherein n is an integer of $2 \leq n \leq 10$, $R^1$ to $R^{26}$ are each a substituent having at least one element selected from carbon, hydrogen, oxygen, halogen, nitrogen, sulfur, phosphorus, boron and silicon; groups optionally selected from $R^1$ to $R^{26}$, preferably from $R^1$ to $R^{2n}$, may form in cooperation a ring other than a benzene ring; and the main chain may contain an atom other than carbon.

Of such compounds, preferably used are 1,3-diethers, and particularly preferably used are 2,2-diisobutyl-1,3-dimethoxypropane, 2-isopropyl-2-isobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl)-1,3-dimethoxypropane, 2-cyclohexyl-2-isopropyl-1,3-dimethoxypropane, 2-isopropyl-2-s-butyl-1,3-dimethoxypropane, 2,2-diphenyl-1,3-dimethoxypropane and 2-cyclopentyl-2-isopropyl-1,3-dimethoxypropane.

Further, the later-described electron donor (III), water, and anionic, cationic or nonionic surface active agents are employable as the electron donor (c).

These electron donors (c) may be used in combination of two or more kinds.

Of the above compounds, preferably used as the electron donors (c) are carboxylic acid esters, more preferably used are polycarboxylic acid esters, and particularly preferably used are phthalic acid esters and polyethers.

(d) Solid Divalent Metallic Halide

In the process for preparing a solid titanium catalyst component according to the invention, a solid divalent metallic halide (d) is employed.

The solid divalent metallic halide is, for example, a solid compound having composition represented by $MX_2$ ( M is a divalent metal atom, and X is Cl, I or Br). Examples of such compounds include $MgCl_2$, $MnCl_2$, $FeCl_2$, $CoCl_2$, $NiCl_2$, $CdCl_2$, $ZnCl_2$, $ZnBr_2$, $NiBr_2$, $CdBr_2$ and $NiI_2$. Of these, preferable are $MgCl_2$, $FeCl_2$, $CoCl_2$ and $NiCl_2$, more preferable are $MgCl_2$ and $FeCl_2$, and particularly preferable is $MgCl_2$.

The solid divalent metallic halide (d) used in the invention is an anhydride, and preferably has a crystalline structure classified as cadmium chloride type.

The crystalline structure classified as cadmium chloride type is a known crystalline structure described in various literature, for example, "ENCYCLOPAEDIA CHIMICA 1" (published by Kyoritsu Shuppan K. K., first edition: Feb. 28, 1962) and "LECTURES OF CONTEMPORARY INORGANIC CHEMISTRY 2, SPECIAL INORGANIC CHEMISTRY, FIRST PART" (by Seiichiro Utsumi, published by Gihodo K. K., first edition: Jul. 20, 1965).

Preparation of Solid Titanium Catalyst Component

In the present invention, the liquid magnesium compound (a), the liquid titanium compound (b), the electron donor (c) and the solid divalent metallic halide (d) (sometimes referred to simply as "solid compound" hereinafter) are contacted to prepare a solid titanium catalyst component.

FIG. 1 shows a preferred example of the process for preparing a solid titanium catalyst component and shows an example of the process for preparing an olefin polymerization catalyst containing the solid titanium catalyst component.

In the contact of the components (a) to (d) to produce a solid, the hydrocarbon solvents described above in the preparation of the liquid magnesium compound (a) can be employed if necessary.

In the preparation of the solid titanium catalyst component, carrier compounds, and organic or inorganic compounds which contain silicon, phosphorus, aluminum or the like and are commonly used as reaction assistants are employable in addition to the above compounds.

Examples of the carrier compounds include metallic oxides, such as $Al_2O_3$, $SiO_2$, $B_2O_3$, $MgO$, $CaO$, $TiO_2$, $ZnO$, $SnO_2$, $BaO$ and $ThO_2$; and resins, such as a styrene/divinylbenzene copolymer. Of these, preferable are $TiO_2$, $Al_2O_3$, $SiO_2$ and a styrene/divinylbenzene copolymer.

There is no specific limitation on the process to prepare the solid titanium catalyst component from the above components, and some examples are given below. Examples of the organoaluminum compounds employable in the following processes are the same as those described later as the organometallic compound (II).

(1) A liquid magnesium compound (a) is contacted with a liquid titanium compound (b), after or simultaneously with precipitating a solid by contacting the magnesium compound with an organometallic compound.

In this process, an electron donor (c) and a solid compound (d) are contacted with the contact product at least once.

(2) A contact product of an inorganic carrier and a liquid organomagnesium compound (a) is contacted with a liquid titanium compound (b), an electron donor (c) and a solid compound (d).

In this process, the contact product of the inorganic carrier and the liquid organomagnesium compound (a) may be previously contacted with a halogen-containing compound and/or an organometallic compound.

(3) An inorganic or organic carrier on which a liquid magnesium compound (a) is supported is contacted with a liquid titanium compound (b).

In this process, an electron donor (c) and a solid compound (d) are contacted with the contact product at least once.

(4) A solution containing a magnesium compound and a liquid titanium compound (b) is contacted with an inorganic or organic carrier, an electron donor (c) and a solid compound (d).

(5) A liquid magnesium compound (a) is contacted with a liquid titanium compound (b) and then contacted with an electron donor (c) and a solid compound (d).

(6) A liquid magnesium compound (a) is contacted with a halogen-containing compound and then contacted with a liquid titanium compound (b).

In this process, an electron donor (c) and a solid compound (d) are used at least once.

(7) A liquid magnesium compound (a) is contacted with an electron donor (c), a solid compound (d) and a liquid titanium compound (b).

(8) A liquid magnesium compound (a) is contacted with an organoaluminum compound and then contacted with a liquid titanium compound (b).

In this process, an electron donor (c) and a solid compound (d) are used at least once.

(9) A liquid magnesium compound (a) having no reduction ability is contacted with a liquid titanium compound (b) in the presence or absence of an electron donor (c).

In this process, an electron donor (c) and a solid compound (d) are used at least once.

(10) A solid compound (d) is suspended in a liquid magnesium compound (a). The resulting suspension is contacted with a liquid titanium compound (b) and then contacted with an electron donor (c).

(11) A solid compound (d) is suspended in a liquid magnesium compound (a), and the resulting suspension is contacted with a liquid titanium compound (b). In this contact, an electron donor (c) is used.

(12) A liquid titanium compound (b) in which a solid compound (d) is suspended is contacted with a liquid magnesium compound (a). In this contact, an electron donor (c) is used.

(13) A liquid titanium compound (b) in which a solid compound (d) is suspended is contacted with a liquid magnesium compound (a) and then contacted with an electron donor (c).

(14) A liquid magnesium compound (a) is contacted with a liquid titanium compound (b) and a solid compound (d) in the presence of an electron donor (c).

(15) A liquid magnesium compound (a) is contacted with a liquid titanium compound (b) and a solid compound (d), and then contacted with an electron donor (c).

(16) A reaction product obtained by any one of the processes (1) to (15) is further contacted with a liquid titanium compound (b).

(17) A reaction product obtained by any one of the processes (1) to (15) is further contacted with an electron donor (c) and a liquid titanium compound (b).

In the contact of the components (a) to (d), the contact of the liquid magnesium compound (a) with the liquid titanium compound (b) is preferably carried out in the presence of the solid compound (d). In this case, the electron donor (c) may be used in any stage, but it is preferable that the liquid magnesium compound (a) is contacted with the liquid titanium compound (b) in the presence of the solid compound (d) and then contacted with the electron donor (c). Of the above processes, preferable are the processes (10) to (17), and particularly preferable is the process (13).

The contact of the above components is carried out at a temperature of usually −70 to 200° C., preferably −50 to 150° C., more preferably −30 to 130° C.

The amounts of the components used for preparing the solid titanium catalyst component vary depending on the preparation process and cannot be decided indiscriminately. However, for example, the electron donor (c) is used in an amount of 0.01 to 10 mol, preferably 0.1 to 5 mol, based on 1 mol of the magnesium compound (a); the titanium compound (b) is used in an amount of 0.01 to 1,000 mol, preferably 0.1 to 200 mol, based on 1 mol of the magnesium compound (a); and the solid compound (d) is used in an amount of 0.5 to 150 mol, preferably 1 to 100 mol, based on 1 mol of the magnesium compound (a).

In the present invention, the solid titanium catalyst component obtained above can be used as such to form an olefin polymerization catalyst, but it is preferable that the solid titanium catalyst component is used after washed with a solvent at 0 to 200° C.

Examples of the solvents include aliphatic hydrocarbon solvents, such as hexane, heptane, octane, nonane, decane and cetane; non-halogen type aromatic hydrocarbon solvents, such as toluene, xylene and benzene; and halogen-containing aromatic hydrocarbon solvents, such as chlorobenzene, o-dichlorobenzene, m-dichlorobenzene, trichlorobenzene, α,α,α-trichlorotoluene, o-chlorotoluene, benzal chloride and 2-chlorobenzyl chloride. Of these, preferably used are aliphatic hydrocarbon solvents and halogen-containing aromatic hydrocarbon solvents.

For washing the solid titanium catalyst component, the hydrocarbon solvent is used in an amount of usually 1 to 10,000 ml, preferably 5 to 5,000 ml, more preferably 10 to 1,000 ml, based on 1 g of the solid.

The washing is preferably carried out until elimination of titanium is finished by washing with hexane at room temperature.

In the solid titanium catalyst component obtained as above, it is desirable that titanium is contained in an amount of 0.1 to 10% by weight, preferably 0.5 to 5% by weight; magnesium and halogen are contained in the total amount of 55 to 94.9% by weight, preferably 65 to 92% by weight; and the electron donor (c) is contained in an amount of 5 to 35% by weight, preferably 7.5 to 30% by weight. When other metallic chloride than magnesium chloride ($MgCl_2$) is used as the solid compound (d), the metal derived from the solid compound (d) is desired to be contained in an amount of 0.05 to 10% by weight, preferably 0.1 to 5% by weight.

When the solid titanium catalyst component obtained as above is used as an olefin polymerization catalyst component, olefins can be polymerized with an extremely high activity and polyolefins of high stereoregularity can be produced.

(II) Oragnometallic Compound

In the preparation of the olefin polymerization catalyst of the invention, an organometallic compound (II) is used together with the solid titanium catalyst component (I). Examples of the organometallic compounds include organoaluminum compounds and alkyl complex compounds of Group I metals and aluminum.

The organoaluminum compounds are represented by, for example, the following formula:

$$R^a{}_nAlX_{3-n}$$

wherein $R^a$ is a hydrocarbon group of 1 to 12 carbon atoms, X is halogen or hydrogen, and n is 1 to 3.

In the above formula, $R^a$ is a hydrocarbon group of 1 to 12 carbon atoms, e.g., an alkyl group, a cycloalkyl group or an aryl group. Particular examples of these groups include methyl, ethyl, n-propyl, isopropyl, isobutyl, pentyl, hexyl, octyl, cyclopentyl, cyclohexyl, phenyl and tolyl.

Examples of such organoaluminum compounds include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compounds are compounds represented by the following formula:

$$R^a{}_nAlQ_{3-n}$$

wherein $R^a$ is the same as above, Q is —$OR^b$ group, —$OSiR^c{}_3$ group, —$OAlR^d{}_2$ group, —$NR^e{}_2$ group, —$SiR^f{}_3$ group or —$N(R^g)AlR^h{}_2$ group, n is 1 to 2, $R^b$, $R^c$, $R^d$ and $R^h$ are each methyl, ethyl, isopropyl, isobutyl, cyclohexyl, phenyl or the like, $R^e$ is hydrogen, methyl, ethyl, isopropyl, phenyl, trimethylsilyl or the like, and $R^f$ and $R^g$ are each methyl, ethyl or the like.

Examples of such organoaluminum compounds include:
(i) compounds of the formula $R^a{}_nAl(OR^b)_{3-n}$, e.g., dimethylaluminum methoxide, diethylaluminum ethoxide and diisobutylaluminum methoxide;
(ii) compounds of the formula $R^a{}_nAl(OSiR^c)_{3-n}$, e.g., $Et_2Al(OSiMe_3)$, $(iso\text{-}Bu)_2Al(OSiMe_3)$ and $(iso\text{-}B)_2Al(OSiEt_3)$;
(iii) compounds of the formula $R^a{}_nAl(OAlR^d{}_2)_{3-n}$, e.g., $Et_2AlOAlEt_2$ and $(iso\text{-}Bu)_2AlOAl(iso\text{-}Bu)_2$;
(iv) compounds of the formula $R^a{}_nAl (NR^e{}_2)_{3-n}$, e.g., $Me_2AlNEt_2$, $Et_2AlNHMe$, $Me_2AlNHEt$, $Et_2AlN(Me_3Si)_2$ and $(iso\text{-}Bu)_2AlN(Me_3Si)_2$;
(v) compounds of the formula $R^a{}_nAl(SiR^f{}_3)_{3-n}$, e.g., $(iso\text{-}Bu)_2AlSiMe_3$; and
(vi) compounds of the formula $R^a{}_nAl[N(R^g)\text{-}AlR^h{}_2]_{3-n}$, e.g., $Et_2AlN(Me)\text{-}AlEt_2$ and $(iso\text{-}Bu)_2AlN(Et)Al(iso\text{-}Bu)_2$.

Also employable are compounds analogous to the above organoaluminum compounds, for example, organoaluminum compounds wherein two or more aluminum atoms are linked to each other through an oxygen atom or a nitrogen atom. Examples of such compounds include $(C_2H_5)_2AlOAl(C_2H_5)_2$, $(C_4H_9)_2AlOAl(C_4H_9)_2$, $(C_2H_5)_2AlN(C_2H_5)Al(C_2H_5)_2$, and aluminoxanes such as methylaluminoxane.

The alkyl complex compounds of Group I metals and aluminum are represented by the following formula:

$$M^1AlR^j{}_4$$

wherein $M^1$ is Li, Na or K, and $R^j$ is a hydrocarbon group of 1 to 15 carbon atoms.

Examples of such compounds include $LiAl(C_2H_5)_4$ and $LiAl(C_7H_{15})_4$.

Of the organometallic compounds mentioned above, preferable are organoaluminum compounds represented by the formulas $R^a{}_3Al$, $R^a{}_nAl(OR^b)_{3-n}$ and $R^a{}_nAl(OAlR^d{}_2)_{3-n}$.

In the present invention, the organometallic compounds (II) may be used in combination of two or more kinds.

(III) Electron Donor

In the preparation of the olefin polymerization catalyst of the invention, an electron donor (III) may be optionally used, in addition to the solid titanium catalyst component (I) and the organoaluminum compound (II). As the electron donor (II), an organosilicon compound having at least one alkoxy group, which is represented by the following formula (i), is employed.

$$R_nSi(OR')_{4-n} \quad (i)$$

wherein R and R' are each a hydrocarbon group, and n is 1, 2 or 3.

Examples of the organosilicon compounds represented by the above formula include trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxyailane, bis-o-tolyldimethoxysilane, bis-m-tolyldimethoxysilane, bis-p-tolyldimethoxysilane, bis-p-tolyldiethoxysilane, bisethylphenyldimethoxysilane, ethyltrimethoxysilane, ethyltriethoxysilane, vinyltrimethoxysilane, methyltrimethoxysilane, n-proyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, n-butyltriethoxysilane, phenyltriethoxysilane, γ-aminopropyltriethoxysilane, chlorotriethoxysilane, ethyltriisopropoxysilane, vinyltributoxysilane, trimethylphenoxysilane, methyltriallyloxysilane, vinyltris (β-methoxyethoxysilane), vinyltriacetoxysilane and dimethyltetraethoxydisiloxane. Also employable are ethyl silicate and butyl silicate.

The organosilicon compound represented by the formula (i) is preferably a compound specifically represented by the following formula (ii):

$$R^a{}_nSi(OR^b)_{4-n} \quad (ii)$$

wherein n is 1, 2 or 3; when n is 1, $R^a$ is a secondary or tertiary hydrocarbon group; when n is 2 or 3, at least one of $R^a$ is a secondary or tertiary hydrocarbon group, $R^a$s may be the same or different; $R^b$ is a hydrocarbon group of 1 to 4 carbon atoms; and when 4−n is 2 or 3, $OR^b$s may be the same or different.

In the organosilicon compound of the formula (ii) having a bulky group, the secondary or tertiary hydrocarbon group is, for example, a cyclopentyl group, a cyclopentenyl group, a cyclopentadienyl group, a substituted cyclopentyl, cyclopentenyl or cyclopentadienyl group, or a hydrocarbon group wherein the carbon adjacent to Si is secondary or tertiary carbon.

Examples of the substituted cyclopentyl groups include cyclopentyl groups having alkyl groups, such as 2-mehtylcyclopentyl, 3-methylcyclopentyl, 2-ethylcyclopentyl, 2-n-butylcyclopentyl, 2,3-dimethylcyclopentyl, 2,4-dimethylcyclopentyl, 2,5-dimethylcyclopentyl, 2,3-diethylcyclopentyl, 2,3,4-trimethylcyclopentyl, 2,3,5-trimethylcyclopentyl, 2,3,4-triethylcyclopentyl, tetramethylcyclopentyl and tetraethylcyclopentyl.

Examples of the substituted cyclopentenyl groups include cyclopentenyl groups having alkyl groups, such as 2-methylcyclopentenyl, 3-methylcyclopentenyl, 2-ethylcyclopentenyl, 2-n-butylcyclopentenyl, 2,3-dimethylcyclopentenyl, 2,4-dimethylcyclopentenyl, 2,5-dimethylcyclpentenyl, 2,3,4-trimethylcyclopentenyl, 2,3,5-trimethylcyclopentenyl, 2,3,4-triethylcyclopentenyl, tetramethylcyclopentenyl and tetraethylcyclopentenyl.

Examples of the substituted cyclopentadienyl groups include cyclopentadienyl groups having alkyl groups, such as 2-mehtylcyclopentadienyl, 3-methylcyclopentadienyl, 2-ethylcyclopentadienyl, 2-n-butylcyclopentadienyl, 2,3-dimethylcyclopentadienyl, 2,4-dimethylcyclopentadienyl, 2,5-dimethylcyclopentadienyl, 2,3-diethylcyclopentadienyl, 2,3,4-trimethylcyclopentadienyl, 2,3,5-trimethylcyclopentadienyl, 2,3,4-triethylcyclopentadienyl, 2,3,4,5-tetramethylcyclopentadienyl, 2,3,4,5-tetraethylcyclopentadienyl, 1,2,314,5-pentamethylcyclopentadienyl and 1,2,3,4,5-pentaethylcyclopentadienyl.

Examples of the hydrocarbon groups wherein the carbon adjacent to Si is secondary carbon include i-propyl, s-butyl, s-amyl and α-methylbenzyl. Examples of the hydrocarbon groups wherein the carbon adjacent to Si is tertiary carbon include t-butyl, t-amyl, α,α'-dimethylbenzyl and adamantyl.

When n is 1, examples of the organosilicon compounds represented by the formula (ii) include trialkoxysilanes, such as cyclopentyltrimethoxysilane, 2-methylcyclopentyltrimethoxysilane, 2,3-dimethylcyclopentyltrimethoxysilane, cyclopentyltriethoxysilane, iso-butyltriethoxysilane, t-butyltriethoxysilane, cyclohexyltrimethoxysilane, cyclohexyltriethoxysilane, 2-norbornanetrimethoxysilane and 2-norbornanetriethoxysilane.

When n is 2, examples of the organosilicon compounds represented by the formula (ii) include dialkoxysilanes, such as dicyclopentyldiethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane and 2-norbornanemethyldimethoxysilane.

Of the organosilicon compounds of the formula (ii) wherein n is 2, preferable are dimethoxysilane compounds represented by the following formula (iii):

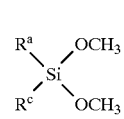

(iii)

wherein $R^a$ and $R^c$ are each independently a cyclopentyl group, a substituted cyclopentyl group, a cyclopentenyl group, a substituted cyclopentenyl group, a cyclopentadienyl group, a substituted cyclopentadienyl group or a hydrocarbon group wherein the carbon adjacent to Si is secondary or tertiary carbon.

Examples of the organosilicon compounds represented by the formula (iii) include:

dicyclopentyldimethoxysilane,
dicyclopentenyldimethoxysilane,
dicyclopentadienyldimethoxysilane,
di-t-butyldimethoxysi lane,
di(2-methylcyclopentyl)dimethoxysilane,
di(3-methylcyclopentyl)dimethoxysilane,
di(2-ethylcyclopentyl)dimethoxysilane,
di(2,3-dimethylcyclopentyl)dimethoxysilane,
di(2,4-dimethylcyclopentyl)dim ethoxysilane,
di(2,5-dimethylcyclopentyl)dimethoxysilane,
di(2,3-diethylcyclopentyl)dimethoxysilane,
di(2,3,4-trimethylcyclopentyl)dimethoxysilane,
di(2,3,5-trimethylcyclopentyl)dimethoxysilane,
di(2,3,4-triethylcyclopentyl)dimethoxysilane,
di(tetramethylcyclopentyl)dimethoxysilane,
di(tetraethylcyclopentyl)dimethoxysilane,
di(2-methylcyclopentenyl)dimethoxysilane,
di(3-methylcyclopentenyl)dimethoxysilane,
di(2-ethylcyclopentenyl)dimethoxysilane,
di(2-n-butylcyclopentenyl)dimethoxysilane,
di(2,3-dimethylcyclopentenyl)dimethoxysilane,
di(2,4-dimethylcyclopentenyl)dimethoxysilane,
di(2,5-dimethylcyclopentenyl)dimethoxysilane,
di(2,3,4-trimethylcyclopentenyl)dimethoxysilane,
di(2,3,5-trimethylcyclopentenyl)dimethoxysilane,
di(2,3,4-triethylcyclopentenyl)dimethoxysilane,
di(tetramethylcyclopentenyl)dimethoxysilane,
di(tetraethylcyclopentenyl)dimethoxysilane,
di(2-methylcyclopentadienyl)dimethoxysilane,
di(3-methylcyclopentadienyl)dimethoxysilane,
dit(2-ethylcyclopentadienyl)dimethoxysilane,
di(2-n-butylcyclopentadienyl)dimethoxysilane,
di(2, 3-dimethylcyclopentadienyl)dimethoxysilane,
di(2,4-dimethylcyclopentadienyl)dimethoxysilane,
di(2, 5-dimethylcyclopentadienyl)dimethoxysilane,
di(2,3-diethylcyclopentadienyl)dimethoxysilane,
di(2,3,4-trimethylcyclopentadienyl)dimethoxysilane,
di(2,3,5-trimethylcyclopentadienyl)dimethoxysilane,
di(2,3,4-triethylcyclopentadienyl)dimethoxysilane,
di(2,3,4,5- tetramethylcyclopentadienyl)dimethoxysilane,
di(2,3,4,5-tetraethylcyclopentadienyl)dimethoxysilane,
di(1,2,3,4,5-pentamethylcyclopentadienyl) dimethoxysilane,
di(1,2,3,4,5-pentaethylcyclopentadienyl) dimethoxysilane, di-t-amyldimethoxysilane,
di(α,α'-dimethylbenzyl)dimethoxysilane,
di(adamantyl)dimethoxysilane,
adamantyl-t-butyldimethoxysilane,
cyclopentyl-t-butyldimethoxysilane,
diisopropyldimethoxysilane,
di-s-butyldimethoxysilane,
di-s-amyldimethoxysilane, and
isopropyl-s-butyldimethoxysilane.

When n is 3, examples of the organosilicon compounds represented by the formula (ii) include monoalkoxysilanes, such as tricyclopentylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane and cyclopentyldimethylethoxysilane.

Of the above compounds, preferable are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane, phenyltriethoxysilane, hexenyltrimethxysilane, cyclopentyltriethoxysilane, tricyclopentylmethoxysilane, cyclopentyldimethylmethoxysilane and dimethoxysilanes represented by the formula (iii). Among them, particularly preferable are dimethoxysilanes represented by the formula (iii), specifically dicyclopentyldimethoxysilane, di-t-butyldimethoxysilane, di(2-methylcyclopentyl)dimethoxysilane, di(3-methylcyclopentyl)dimethoxysilane and di-t-amyldimethoxysilane.

Also employable as the electron donors (III) are:
2,6-substituted piperidines;
2,5-substituted piperidines;
substituted methylenediamines, such as N,N,N',N'-tetramethylmethylenediamine and N,N,N',N'-tetraethylmethylenediamine;
nitrogen-containing compounds, such as substituted imidazolidines (e.g., 1,3-dibenzylimidazolidine and 1,3-dibenzyl-2-phenylimidazolidine);
phosphorus-containing compounds, such as phosphites (e.g., triethyl phosphite, tri-n-propyl phosphite, triisopropyl phosphite, tri-n-butyl phosphite, triisobutyl phosphite, diethyl-n-butyl phosphite and diethylphenyl phosphite);
oxygen-containing compounds, such as 2,6-substituted tetrahydropyrans and 2,5-substituted tetrahydropyrans; and
the aforesaid electron donors (c), particularly polyether compounds.

The electron donors (III) may be used in combination of two or more kinds.

Olefin Polymerization Catalyst

The olefin polymerization catalyst according to the invention comprises:
(I) the solid titanium catalyst component,
(II) the organometallic compound, and optionally
(III) the electron donor.

In the present invention, a prepolymerized catalyst may be formed by prepolymerizing an olefin in the presence of the above-mentioned olefin polymerization catalyst.

Examples of the olefins used for the prepolymerization include α-olefins of 2 or more carbon atoms, such as ethylene, propylene, 1-butene, 1-pentene, 1-hexene, 3-methyl-i-butene, 3-methyl-i-pentene, 3-ethyl-1-pentene, 4-methyl-1-pentene, 4,4-dimethyl-i-pentene, 4-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, 1-octadecene and 1-eicosene. Further, the later-described vinyl compounds and polyene compounds are also employable for the prepolymerization. These compounds may be used in combination of two or more kinds.

The olefin used for the prepolymerization may be the same as or different from the later-described olefin used for the polymerization.

There is no specific limitation on the method of performing the prepolymerization. For example, the prepolymerization can be carried out under such conditions that the olefins and the polyene compounds are liquid state, or it can be carried out in the presence of an inert solvent or in a gas phase. It is preferable that the olefins and the catalyst components are added to an inert hydrocarbon solvent and the prepolymerization is carried out under relatively mild conditions. The prepolymerization may be conducted under such conditions that the resulting prepolymer is dissolved in the polymerization medium or under such conditions that the prepolymer is not dissolved therein, but the prepolymerization is preferably conducted under such conditions that the prepolymer is not dissolved in the polymerization medium.

It is desirable that the prepolymerization is carried out at a temperature of usually about −20 to +100° C., preferably about −20 to +80° C., more preferably −10 to +40° C.

The prepolymerization may be carried out by any of batchwise, semi-continuous and continuous processes.

The concentration of the catalyst in the prepolymerization system may be higher than that of the catalyst in the polymerization system.

Though the concentrations of the catalyst components in the prepolymerization system vary depending on the types of the catalyst components used, etc., the concentration of the solid titanium catalyst component (I) is usually about 0.001 to 5,000 mmol, preferably about 0.01 to 1,000 mmol, particularly preferably 0.1 to 500 mmol, in terms of titanium atom, based on 1 liter of the polymerization volume.

The organometallic compound (II) is used in such an amount that a pre(co)polymer is produced in an amount of 0.01 to 2,000 g, preferably 0.03 to 1,000 g, more preferably 0.05 to 200 g, based on 1 g of the solid titanium catalyst component (I). That is, the organometallic compound (II) is used in an amount of usually about 0.1 to 1,000 mol, preferably about 0.5 to 500 mol, particularly preferably 1 to 100 mol, based on 1 mol of titanium in the solid titanium catalyst component (I).

In the prepolymerization, the electron donor (III) can be used, if necessary, in an amount of usually 0.01 to 50 mol, preferably 0.05 to 30 mol, more preferably 0.1 to 10 mol, based on 1 mol of the titanium atom in the solid titanium catalyst component (I).

A molecular weight modifier such as hydrogen can be used in the prepolymerization.

When the prepolymerized catalyst is obtained in the form of a suspension, the suspension may be used as such in the subsequent polymerization process, or the prepolymerized catalyst separated from the suspension can be used in the polymerization process.

The prepolymerized catalyst obtained in the form of a suspension can be used, as it is, as the olefin polymerization catalyst in some cases. However, to the prepolymerized catalyst may be added the organometallic compound (II) and/or the electron donor (III), if desired, to form an olefin polymerization catalyst. If the electron donor (III) is not used in the prepolymerization, the resulting prepolymerized catalyst is used together with the electron donor (III) to form an olefin polymerization catalyst, and it is desirable to use the electron donor (III) when α-olefins of 3 more carbon atoms are polymerized.

In the olefin polymerization catalyst according to the invention, other components than the above-mentioned ones, which are useful for olefin polymerization, may be contained.

Process for Olefin Polymerization

In the process for olefin polymerization according to the invention, an olefin is polymerized or copolymerized in the presence of the olefin polymerization catalyst comprising the solid titanium catalyst component (I), the organometallic compound catalyst component (II), and optionally, the electron donor (III), or in the presence of the prepolymerized catalyst.

Examples of the olefins employable herein include α-olefins of 2 or more carbon atoms, which are the same as those used for the prepolymerization Also employable are:

cycloolefins, such as cyclopentene, cycloheptene, norbornene, 5-ethyl-2-norbornene, tetracyclododecene and 2-ethyl-1,4,5,8-dimethano-1,2,3,4,4a,5,8,8a-octahydronaphthalene; and vinyl compounds, such as styrene, dimethylstyrenes, allylnaphthalene, allylnorbornane, vinylnaphthalenes, allyltoluenes, allylbenzene, vinylcyclopentane, vinylcyclohexane, vinylcycloheptane and allyltrialkylsilanes.

Of these, preferably used are ethylene, propylene, 1-butene, 3-methyl-1-butene, 3-methyl-1-pentene, 4-methyl-1-pentene, vinylcyclohexene, dimethylstyrene, allyltrimethylsilane and allylnaphthalene.

The olefin may be copolymerized with a small amount of a diene compound.

Examples of the diene compounds include 1,3-butadiene, 1,3-pentadiene, 1,4-pentadiene, 1,3-hexadiene, 1,4-hexadiene, 1,5-hexadiene, 4-methyl-1,4-hexadiene, 5-methyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, 1,7-octadiene, 1,9-decadiene, isoprene, butadiene, ethylidene norbornene, vinyl norbornene and dicyclopentadiene. These diene compounds may be used in combination of two or more kinds.

In the process of the invention, the polymerization can be carried out as any of liquid phase polymerization, such as solution polymerization or suspension polymerization, and gas phase polymerization.

When the polymerization is carried out as slurry polymerization, the aforesaid inert organic solvent is employable as the solvent, or an olefin which is liquid at the reaction temperature is also employable as the solvent.

In the polymerization, the solid titanium catalyst component (I) or the prepolymerized catalyst is used in an amount of usually about 0.001 to 100 mmol, preferably about 0.005 to 20 mmol, in terms of titanium atom, based on 1 liter of the polymerization volume.

The organometallic compound (II) is used in such an amount that the amount of the metal atom in the compound (II) becomes usually about 1 to 2,000 mol, preferably about 2 to 500 mol, based on 1 mol of the titanium atom in the polymerization system.

The electron donor (III) may be used or may not be used. If necessary, the electron donor (III) is used in an amount of usually about 0.001 to 10 mol, preferably 0.01 to 5 mol, based on 1 mol of the metal atom in the organometallic compound (II).

As described above, if the prepolymerized catalyst is used in the polymerization, none of the organometallic compound (II) and the electron donor (III) may be used according to circumstances. When the olefin polymerization catalyst is formed from the prepolymerized catalyst and the component (II) and/or the component (III), the component (II) and/or the component (III) is used in the above-mentioned amount.

If hydrogen is used in the polymerization, the molecular weight of the resulting polymer can be modified, to thereby obtain a polymer having a high melt flow rate.

In the process for olefin polymerization according to the invention, the polymerization is carried out at a temperature of usually about 20 to 300° C., preferably about 50 to 150° C., under a pressure of usually atmospheric pressure to 100 kg/cm$^2$, preferably about 2 to 50 kg/cm$^2$, though these conditions vary depending on the type of the olefin, the type of the polymerization, etc.

In the process of the invention, the polymerization can be carried out batchwise, semi-continuously or continuously. The polymerization can be conducted in two or more stages under different reaction conditions.

In the present invention, a homopolymer of an olefin may be prepared, or a random or block copolymer of two or more olefins may be prepared.

EFFECT OF THE INVENTION

By the use of an olefin polymerization catalyst comprising the solid titanium catalyst component obtained by the present invention, olefins can be polymerized with an extremely high activity, and besides polyolefins of high stereoregularity can be produced when α-olefins of 3 or more carbon atoms are polymerized.

EXAMPLE

The present invention will be further described with reference to the following examples, but it should be construed that the invention is in no way limited to those examples.

The quantity of a decane-soluble component, melting point and bulk specific gravity of the olefin polymer were measured in the following manner.

Measurement of Quantity of Decane-Soluble Component

To a 1 liter flask, 3 g of a sample, 20 mg of 2,6-di-tert-butyl-4-methylphenol and 500 ml of n-decane were fed, and they were heated at 145° C. to give a solution. Then, the solution was cooled to 23° C. over a period of 8 hours and maintained at 23° C. for 8 hours. The n-decane solution containing a solid precipitated and a polymer dissolved was subjected to solid-liquid separation through filtration. The liquid phase was dried at 150° C. under reduced pressure until a constant weight was reached, followed by measuring the weight. The quantity of the decane-soluble component was determined by calculating a percentage of the weight of the polymer dissolved to the weight of the sample.

Measurement of Melting Point (Tm)

The melting point was determined in accordance with ASTM-1 using DSC-7 of Perkin Elmer Co. That is, a sample was heated from room temperature to 200° C. at a rate of 320° C./min, maintained at 200° C. for 10 minutes and then cooled to 30° C. at a rate of 10° C./min. An exotherm curve given when the polypropylene was crystallized by cooling was treated with an analytical program of DSC-7, to determine the temperature (Tc) at the maximum peak of the exothermic peaks. Subsequently, the sample was maintained at 30° C. for 5 minutes and then heated up to 200° C. at a rate of 10° C./min. An endotherm curve given when the polypropylene was melted by heating was treated with an analytical program of DSC-7, to determine the temperature (Tm) at the maximum peak of the endothermic peaks.

Measurement of Bulk Specific Gravity

The bulk specific gravity was measured in accordance with JIS K 6721.

Example 1

Preparation of Solid Titanium Catalyst Component (I-1)

A mixture of 7.14 g (75 mmol) of anhydrous magnesium chloride, 37.5 ml of decane and 35.1 ml (225 mmol) of 2-ethylhexyl alcohol was heated at 130° C. for 2 hours to give a homogeneous solution. To the homogeneous solution was added 1.36 g (11.5 mmol) of 2-butoxyethanol, and the mixture was stirred at 130° C. for 1 hour to dissolve 2-butoxyethanol in the solution. Then, the resulting solution was cooled to room temperature.

In 200 ml (1.8 mol) of titanium tetrachloride, 0.0714 g (0.75 mmol) of solid anhydrous magnesium chloride was S suspended, and the suspension was maintained at −20° C. To the suspension was dropwise added the whole of the homogeneous solution obtained above over a period of 1 hour. After the dropwise addition, the temperature of the resulting solution was raised to 110° C. over a period of 4 hours. When the temperature reached 110° C., 5.03 ml (18.8 mmol) of diisobutyl phthalate was added, followed by stirring at the same temperature as above for another 2 hours.

After the 2-hour reaction was completed, the resulting solid was recovered by hot filtration. The solid was resuspended in 375 ml of 1,2,4-trichlorobenzene, and the suspension was heated again at 130° C. for 1 hour.

After the reaction was completed, the resulting solid was recovered by hot filtration and washed with decane at 110° C. and hexane. The washing was continued until any titanium compound was not detected in the washing liquid.

Thus, a hexane slurry of a solid titanium catalyst component (I-1) was obtained. A part of the solid titanium catalyst component (I-1) (hexane slurry) was withdrawn and dried to analyze composition of the catalyst component.

The solid titanium catalyst component (I-1) contained 3.3% by weight of Ti, 16.0% by weight of Mg, 48.0% by weight of Cl and 23.5% by weight of diisobutyl phthalate.

Preparation of Prepolymerized Catalyst (T-1)

To a 200 ml glass reactor purged with nitrogen, 100 ml of purified hexane was introduced. Then, 2 mmol of triethylaluminum, 0.4 mmol of dicyclopentyldimethoxysilane and 0.2 mmol (in terms of titanium atom) of the solid titanium catalyst component (I-1) obtained above were further introduced. Thereafter, propylene was fed to the reactor at a feed rate of 1.0 1/hr for 1 hour.

After the feeding of propylene was completed, the resulting solid was filtered and washed twice with purified hexane.

The prepolymerized catalyst (I-1) thus obtained was resuspended in decane, and the whole of the suspension was transferred into a catalyst bottle to obtain a prepolymerized catalyst (I-1).

Polymerization

To a 1 liter autoclave, 400 ml of purified heptane was introduced. Then, 0.4 mmol of triethylaluminum, 0.4 mmol of dicyclopentyldimethoxysilane and 0.008 mmol (in terms of titanium atom) of the prepolymerized catalyst (I-1) obtained above were further introduced at 60° C. in an atmosphere of propylene. Thereafter, 100 ml of hydrogen was added, and the temperature of the system was raised to 70° C. and maintained at this temperature for 1 hour to perform polymerization of.propylene. During the polymerization, the pressure was maintained at 5 kg/cm$^2$-G. After the polymerization was completed, the resulting slurry containing a polymer produced was filtered to separate the slurry into a white granular polymer and a liquid phase. The results are set forth in Table 1.

Example 2

Preparation of Solid Titanium Catalyst Component (I-2)

A solid titanium catalyst component (I-2) was prepared in the same manner as in Example 1, except that the amount of the solid anhydrous magnesium chloride to be suspended in titanium tetrachloride was varied to 0.714 g (7.5 mmol). The composition of the catalyst component was analyzed in the same manner as in Example 1.

The solid titanium catalyst component (I-2) contained 1.8% by weight of Ti, 19.0% by weight of Mg, 58.0% by weight of Cl and 16.7% by weight of diisobutyl phthalate.

Preparation of Prepolymerized Catalyst (I-2)

A prepolymerized catalyst (I-2) was obtained in the same manner as in Example 1, except that the solid titanium catalyst component (I-2) was used in place of the solid titanium catalyst component (I-1).

Polymerization

Propylene was polymerized in the same manner as in Example 1, except that the prepolymerized catalyst (I-2) was used in place of the prepolymerized catalyst (I-1). The results are set forth in Table 1.

Example 3

Preparation of Solid Titanium Catalyst Component (I-3)

A solid titanium catalyst component (I-3) was prepared in the same manner as in Example 1, except that in place of 0.0714 g (0.75 mmol) of the solid anhydrous magnesium chloride, 0.095 g (0.75 mmol) of solid anhydrous iron(II) chloride was suspended in titanium tetrachloride. The composition of the catalyst component was analyzed in the same manner as in Example 1.

The solid titanium catalyst component (I-3) contained 1.7% by weight of Ti, 19.0% by weight of Mg, 0.3% by weight of Fe, 58.0% by weight of Cl and 17.6% by weight of diisobutyl phthalate.

Preparation of Prepolymerized Catalyst (I-3)

A prepolymerized catalyst (I-3) was obtained in the same manner as in Example 1, except that the solid titanium catalyst component (I-3) was used in place of the solid titanium catalyst component (I-1).

Polymerization

Propylene was polymerized in the same manner as in Example 1, except that the prepolymerized catalyst (I-3) was used in place of the prepolymerized catalyst (I-1). The results are set forth in Table 1.

Example 4

Preparation of Solid Titanium Catalyst Component (I-4)

A solid titanium catalyst component (I-4) was prepared in the same manner as in Example 1, except that in place of 0.0714 g (0.75 mmol) of the solid anhydrous magnesium chloride, 0.95 g (7.5 mmol) of solid anhydrous iron(II) chloride was suspended in titanium tetrachloride. The composition of the catalyst component was analyzed in the same manner as in Example 1.

The solid titanium catalyst component (I-4) contained 1.3% by weight of Ti, 18.0% by weight of Mg, 2.9% by weight of Fe, 55.0% by weight of Cl and 14.3% by weight of diisobutyl phthalate.

Preparation of Prepolymerized Catalyst (I-4)

A prepolymerized catalyst (I-4) was obtained in the same manner as in Example 1, except that the solid titanium catalyst component (I-4) was used in place of the solid titanium catalyst component (I-1).

Polymerization

Propylene was polymerized in the same manner as in Example 1, except that the prepolymerized catalyst (I-4) was used in place of the prepolymerized catalyst (I-1). The results are set forth in Table 1.

Comparative Example 1

Preparation of Solid Titanium Catalyst Component (I-5)

A solid titanium catalyst component (I-5) was prepared in the same manner as in Example 1, except that 0.0714 g (0.75 mmol) of the solid anhydrous magnesium chloride was not suspended in titanium tetrachloride. The composition of the catalyst component was analyzed in the same manner as in Example 1.

The solid titanium catalyst component (I-5) contained 6.0% by weight of Ti, 13.0% by weight of Mg, 47.0% by weight of Cl and 25.4% by weight of diisobutyl phthalate.

Preparation of Prepolymerized Catalyst (I-5)

A prepolymerized catalyst (I-5) was obtained in the same manner as in Example 1, except that the solid titanium catalyst component (I-5) was used in place of the solid titanium catalyst component (I-1).

Polymerization

Propylene was polymerized in the same manner as in Example 1, except that the prepolymerized catalyst (I-5) was used in place of the prepolymerized catalyst (I-1). The results are set forth in Table 1.

Comparative Example 2

Preparation of Solid Titanium Catalyst Component (I-6)

A solid titanium catalyst component (I-6) was prepared in the same manner as in Example 1, except that in place of 0.0714 of (0.75 mmol) of the solid anhydrous magnesium chloride, 0.1376 g (0.75 mmol) of strontium titanate ($SrTiO_3$) was suspended in titanium tetrachloride. The composition of the catalyst component was analyzed in the same manner as in Example 1.

The solid titanium catalyst component (I-6) contained 4.0% by weight of Ti, 15.0% by weight of Mg, 0.5% by weight of Sr, 46.0% by weight of Cl and 23.4% by weight of diisobutyl phthalate.

Preparation of Prepolymerized Catalyst (1–6)

A prepolymerized catalyst (I-6) was obtained in the same manner as in Example 1, except that the solid titanium catalyst component (I-6) was used in place of the solid titanium catalyst component (I-1).

Polymerization

Propylene was polymerized in the same manner as in Example 1, except that the prepolymerized catalyst (I-6) was used in place of the prepolymerized catalyst (I-1). The results are set forth in Table 1.

Comparative Example 3

Preparation of Solid Titanium Catalyst Component (I-7)

A solid titanium catalyst component (I-7) was prepared in the same manner as in Example 1, except that in place of 0.0714 g (0.75 mmol) of the solid anhydrous magnesium chloride, 0.0599 g (0.75 mmol) of titanium oxide was suspended in titanium tetrachloride. The composition of the catalyst component was analyzed in the same manner as in Example 1.

The solid titanium catalyst component (I-7) contained 2.1% by weight of Ti, 19.0% by weight of Mg, 58.0% by weight of Cl and 18.0% by weight of diisobutyl phthalate.

Preparation of Prepolymerized Catalyst (I-7)

A prepolymerized catalyst (I-7) was obtained in the same manner as in Example 1, except that the solid titanium catalyst component (I-7) was used in place of the solid titanium catalyst component (I-1).

Polymerization

Propylene was polymerized in the same manner as in Example 1, except that the prepolymerized catalyst (I-7) was used in place of the prepolymerized catalyst (I-1). The results are set forth in Table 1.

TABLE 1

| | Yield of polymer (g) | | Activity based on catalyst (g-PP/g-cat.) | Quality of decane-soluble component (wt%) | | Tm (°C.) | Bulk specific gravity (g/ml) |
|---|---|---|---|---|---|---|---|
| | Power portion | solvent-soluble portion | | in granular polymer | in polymer | | |
| Ex.1 | 170.6 | 0.1 | 6460 | 0.12 | 0.18 | 164.8 | 0.38 |
| 2 | 202.8 | 0.1 | 6880 | 0.10 | 0.15 | 164.8 | 0.36 |
| 3 | 222.2 | 0.1 | 6730 | 0.10 | 0.14 | 164.9 | 0.37 |
| 4 | 170.6 | 0.1 | 6460 | 0.12 | 0.18 | 164.8 | 0.38 |

TABLE 1-continued

| | Yield of polymer (g) | | Activity based on catalyst (g-PP/g-cat.) | Quality of decane-soluble component (wt%) | | Tm (°C.) | Bulk specific gravity (g/ml) |
|---|---|---|---|---|---|---|---|
| | Power portion | solvent-soluble portion | | in granular polymer | in polymer | | |
| Com. Ex. | | | | | | | |
| 1 | 174.0 | 0.0 | 3590 | 0.05 | 0.05 | 164.5 | 0.36 |
| 2 | 28.1 | 0.0 | 1450 | 0.05 | 0.05 | 164.8 | 0.37 |
| 3 | 99.3 | 0.1 | 4440 | 0.15 | 0.25 | 165.0 | 0.37 |

What is claimed is:

1. A process for preparing a solid titanium catalyst component, comprising contacting:
   (a) a liquid magnesium compound, wherein said liquid magnesium compound is a liquid phase magnesium compound or a solution of a solid magnesium compound;
   (b) a liquid titanium compound;
   (c) an electron donor; and
   (d) a solid divalent metallic halide, wherein said solid divalent metallic halide has a crystalline structure of cadmium chloride type.

2. The process according to claim 1, wherein the solid divalent metallic halide (d) is $MgCl_2$, $MnCl_2$, $FeCl_2$, $CoCl_2$, $NiCl_2$, $CdCl_2$, $ZnCl_2$, $ZnBr_2$, $NiBr_2$, $CdBr_2$ or $NiI_2$.

3. The process for preparing a solid titanium catalyst component as claimed in claim 1, wherein the contact of the liquid magnesium compound (a) with the liquid titanium compound (b) is carried out in the presence of the solid divalent metallic halide (d), to prepare the solid titanium catalyst component.

4. An olefin polymerization catalyst comprising:
   (I) a solid titanium catalyst component obtained by the process for preparing a solid titanium catalyst component as claimed in claim 1,
   (II) an organometallic compound, and optionally
   (III) an electron donor.

5. A prepolymerized catalyst obtained by prepolymerizing an olefin in the presence of the olefin polymerization catalyst as claimed in claim 4.

6. A process for olefin polymerization, comprising polymerizing an olefin in the presence of the olefin polymerization catalyst as claimed in claim 4.

7. An olefin polymerization catalyst comprising:
   (I) the prepolymerized catalyst as claimed in claim 5, and optionally
   (II) an organometallic compound and
   (III) an electron donor.

8. A process for olefin polymerization, comprising polymerizing an olefin in the presence of the catalyst as claimed in claim 7.

9. The process according to claim 1, wherein the solid divalent metallic halide (d) is $MX_2$, wherein M is a divalent metal atom, and X is Cl, I or Br.

10. The olefin polymerization catalyst according to claim 4, wherein said electron donor is a phosphorus-containing compound.

11. The olefin polymerization catalyst according to claim 4, wherein said electron donor is a silane.

12. The olefin polymerization catalyst according to claim 4, wherein said electron donor is a piperidine.

13. The olefin polymerization catalyst according to claim 4, wherein said electron donor is an alcohol.

14. The olefin polymerization catalyst according to claim 4, wherein said electron donor is a ketone.

15. The olefin polymerization catalyst according to claim 4, wherein said electron donor is an aldehyde.

16. The olefin polymerization catalyst according to claim 4, wherein said electron donor is an organic ester.

17. The olefin polymerization catalyst according to claim 4, wherein said electron donor is an organic ether.

18. The olefin polymerization catalyst according to claim 4, wherein said electron donor is an acid halide.

19. The olefin polymerization catalyst according to claim 4, wherein said electron donor is a nitrogen-containing compound.

20. The olefin polymerization catalyst according to claim 4, wherein said electron donor is an oxygen-containing compound.

* * * * *